F. H. ALEXANDER.
CLUTCH COUPLING FOR THE TRANSMISSION OF POWER BY SHAFTING.
APPLICATION FILED MAR. 4, 1919.
1,335,543.
Patented Mar. 30, 1920.
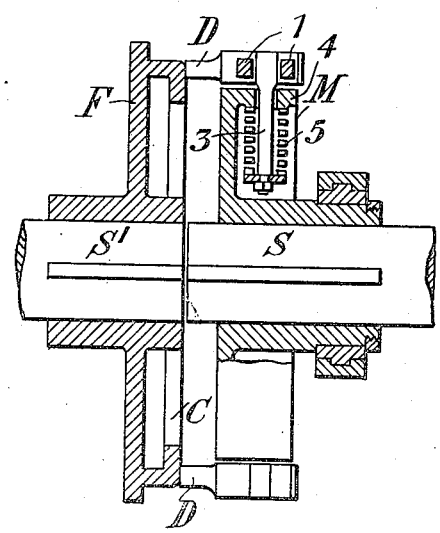
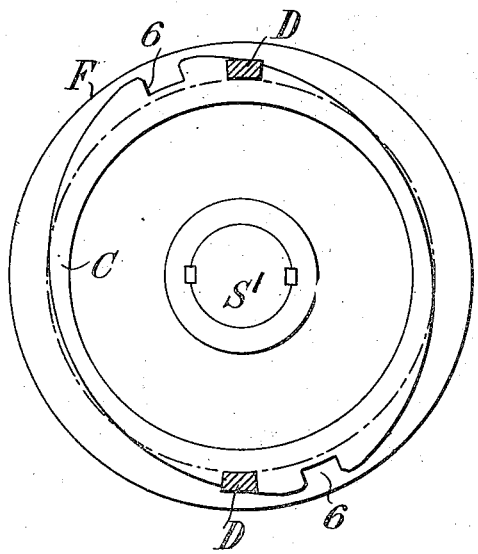
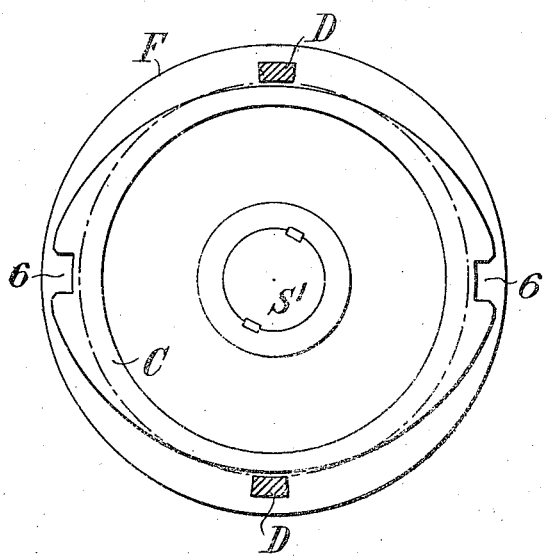
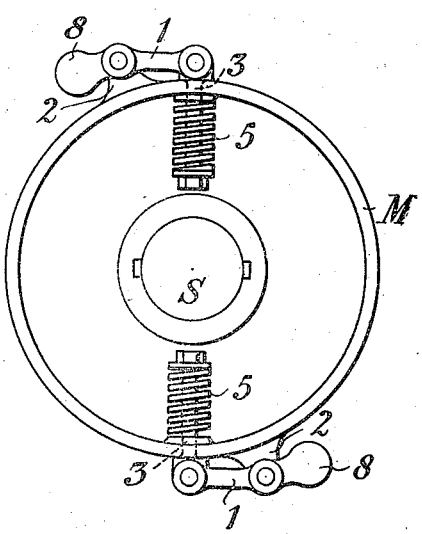
Inventor
Francis Herbert Alexander

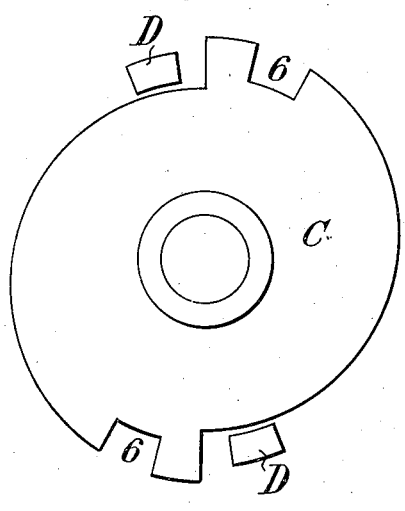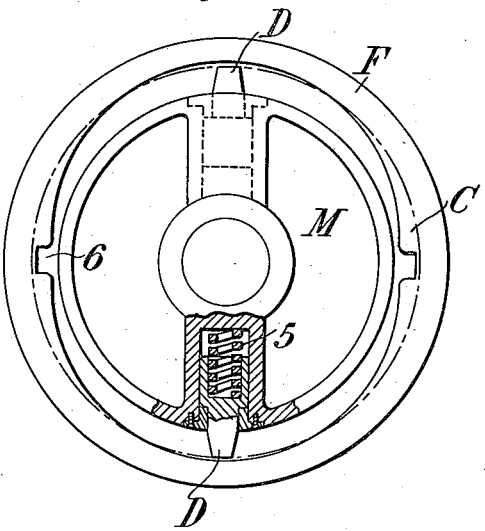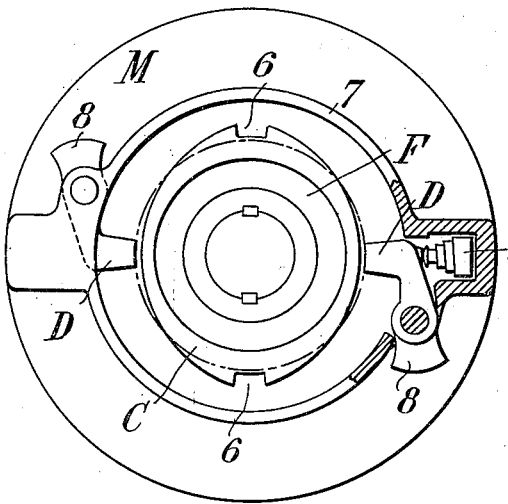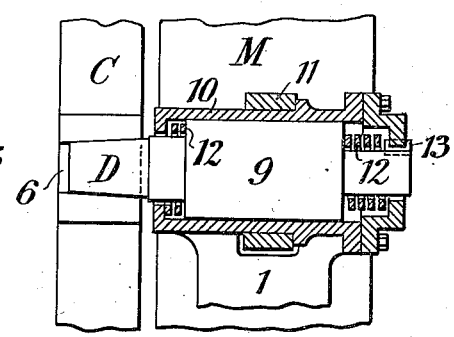

UNITED STATES PATENT OFFICE.

FRANCIS HERBERT ALEXANDER, OF JESMOND, NEWCASTLE-UPON-TYNE, ENGLAND.

CLUTCH-COUPLING FOR THE TRANSMISSION OF POWER BY SHAFTING.

1,335,543.          Specification of Letters Patent.     Patented Mar. 30, 1920.

Application filed March 4, 1919. Serial No. 280,559.

*To all whom it may concern:*

Be it known that I, FRANCIS HERBERT ALEXANDER, a subject of His Majesty the King of Great Britain, residing at 34 Burdon Terrace, Jesmond, Newcastle-upon-Tyne, England, have invented certain new and useful Improvements in and Relating to Clutch-Couplings for the Transmission of Power by Shafting; and I do hereby declare the following to be a full, clear, and exact description of the invention, such as will enable others skilled in the art to which it appertains to make and use the same.

This invention has reference to improvements in or relating to clutch couplings for the transmission of power by shafting, of the kind wherein a dog or projection on one clutch member or disk, is caused to engage within a recess of the other clutch member or disk, to operatively connect these members to transmit the torque, by relative movement of said members in an axial direction.

With couplings of this type as hitherto usually constructed, it is frequently difficult to operatively connect the clutch members when the same are rotating, especially when they are rotating at different angular speeds, since this connection can only be made at the moment when the dog of the male member is opposite a recess in the female member.

The principal object of my invention is to facilitate the operative connection of the male and female members of such a clutch as above referred to, and this object I attain by so constructing and arranging the clutch coupling, that before the dog enters its recess there will be a period of sliding pressure contact between it and a cam on the female member, the effect of which is to bring the angular speeds of the two members closer together.

According to my invention, relative movement between the relatively rotating male and female clutch members in an axial direction in order to couple them, causes a radially movable dog carried by the male clutch member to pass over the operative surface of a cam provided on the female clutch member and to slide along the same in pressure contact therewith, the pressure between the dog and cam surface being obtained by means of spring action applied to the dog, or by centrifugal force acting thereon, or by a combination of both. When the dog reaches the top of the cam it comes opposite to the recess with which it is to engage, into which it is drawn, or projected, radially, by the said spring or centrifugal action.

Instead of entering a recess, the dog may engage with a stop.

During the period of sliding pressure contact between the dog and cam, there is a tangential component of force and a frictional force which both tend to bring the angular speeds of the male and female members closer together, and thus to facilitate the entry of the dog into the recess when it comes opposite thereto, and also lessens shock or jar when the dog engages with such recess, or with a stop.

The male clutch member may have one dog only, or any convenient number of dogs, the female clutch member having a corresponding number of cam sections or cam surfaces, and recesses or stops.

During the rotation of a connected clutch coupling of the type to which my invention relates, there is usually a continuous series of small movements taking place at the contacting surfaces of the dog and its recess, and the resulting friction tends to cause heating, and possible seizing if the pressure between these surfaces is of any magnitude. This friction I may eliminate or minimize by a special construction and arrangement of dog, as hereinafter described.

I will now fully describe my invention and the manner of performing same having reference to the annexed drawings in which similar reference letters and numerals refer to corresponding parts in all the figures, and wherein:—

Figure 1 is a part sectional side elevation of a clutch coupling in accordance with my invention.

Figs. 2 and 3 are end elevations showing the inner face of the female clutch member in different positions.

Fig. 4 is an end elevation showing the back of the male clutch member.

Fig. 5 is an end elevation of a modified construction of female clutch member.

Figs. 6 and 7 are part sectional end elevations showing clutches of modified construction, and, Fig. 8 is a detail.

Referring to Figs. 1 to 4, the male clutch member M slidably keyed to the shaft S carries the radially movable and laterally projecting dogs D, which are pivotally connected with links 1 in turn pivoted to the lugs 2 on the periphery of said member, as seen in Fig. 4. A rod 3 extending radially from each dog passes slidably through a hole or bearing in the annular flange 4 of member M and is surrounded by the helical spring 5 which tends to draw the dog radially inwardly.

Integral with or fixed to the female clutch member F keyed to the shaft S', is the cam member C, here formed with two eccentric peripheral sections or cam surfaces, diametrically opposed recesses 6 being formed between these cam surfaces at their highest parts, here the points at greatest radial distance from the clutch axis, as seen clearly in Figs. 2 and 3. The normal or resting positions of the dogs D in relation to the cam member are shown in Figs. 2 and 3, and in these figures a dot and dash circle indicates the path in which the dogs rotate when the clutch is disengaged. It will be seen that portions of the cam surfaces, which may be considered as their lower portions, substantially removed from the recesses 6 and about midway between these recesses, lie at a less radial distance from the clutch axis than do the dogs.

Initial connection of the members M and F is effected by a relative approaching movement between these members when relatively rotating, the dogs D then pass over the said lower portions of the cam surfaces, and during continued relative rotation of the clutch members the dogs slide up the said cam surfaces, being thereby moved radially outward, and held pressed against said surfaces by the springs 5, until they come opposite the recesses 6 at the tops of the cam surfaces with which they are caused to engage by the action of said springs 5, which now draw the dogs radially inward, the operative connection of the clutch members M and F being thus completed.

During the period of spring pressed sliding contact between the dogs and the said cam surfaces, there is a tangential component of force and a frictional force which both tend to bring the angular speeds of the members M and F closer together, thereby facilitating the entry of the dogs into the recesses 6 when they come opposite to them, and also reducing shock or jar when the dogs and said recesses engage. The coupling is disconnected by causing a relative separating movement between the clutch members M and F by any suitable means.

If in relative movement between the members M and F axially to connect the coupling, the dogs should first contact with the side face of the cam member C, they cannot enter the notches 6 laterally since the latter lie outside the path, indicated by the dot and dash circles Figs. 2 and 3, in which the dogs are rotating; the dogs will thus ride over the smooth side surface of the cam member C until they reach those portions where they can pass over the periphery of said member, as seen in Fig. 3. In Fig. 4, 8 indicates counterweights which may be applied to the links 1 so as to counteract any tendency of the dogs to move outwardly owing to the action of centrifugal force; the centrifugal action of these counterweights will also assist the springs 5 in pressing the dogs against the cam surfaces when in sliding contact therewith.

A clutch coupling constructed as above described will obviously operate in both directions of rotation.

The modified construction of cam or female member shown in Fig. 5 gives the dogs and cam surfaces a longer period of sliding contact, i. e. from adjacent to one recess 6 to the other recess, instead of from about midway between the recesses to either recess, as seen in Fig. 3.

The modification, Fig. 6, shows dogs D slidable in radial guides formed in the member M, the springs 5 tending to resist their inward movement. The dogs D may here lie entirely within the surface planes of the member M and need not project laterally from said member as in Fig. 1. Here the cam surfaces are constituted by sections of the inner periphery of a cam member C. When there is relative axial approaching movement between the relatively rotating members M and F, member M enters within the cam member C, and the dogs D pass across those portions of the cam surfaces farthest removed from the clutch axis and then slide along these surfaces, spring pressed thereon by the springs 5, to the recesses 6 at the tops of the cam surfaces, here the points at least radial distance from the clutch axis. In this modified construction the dogs D tend to move radially outward owing to centrifugal force when the member M is rotating, and thus, using relatively heavy or weighted dogs, it may be possible to dispense with the springs 5 and to rely on the action of centrifugal force for obtaining the necessary pressure contact between the dogs and the cam surfaces.

In the modification, Fig. 7, the cam C of the female member F is of similar construction to that shown in Figs. 2 and 3, but the dogs D are here in the form of pivoted pawls extending inwardly from a flange 7 on the inner face of the male member M, and are spring pressed against the cam surfaces of the member C during relative rotation of the members M and F by the springs 5 shown as arranged in pockets extending from the said flange 7. In this construction also the dogs may lie entirely within the surface planes of the male member M and need not project laterally therefrom as in Fig. 1, since when there is relative axial approaching movement between the members M and F, the cam member C enters within the annular flange 7 carrying the dogs. The counterweights 8 act in a similar manner to the counterweights 8 in Fig. 4, as described above.

It will be noted on referring to Figs. 3, 6 and 7 that the cam surface is so shaped and arranged that on initial connection of the clutch members by their relative axial movement there will be a short period of inoperative relative motion, free from pressure, between the dog and the cam surface after the dog enters within the plane of the latter, the object of this being to render it easy to press the dog fully home before pressure contact between it and the cam takes place.

Friction resulting from small movements taking place between the contacting surfaces of the dog and its recess during the rotation of the connected coupling may be eliminated or minimized by constructing and arranging the dog as shown in the part sectional plan view, Fig. 8.

Here the dog D extends from the end of a short shaft 9 of relatively large diameter fitted with a bush or sleeve 10 carried on the end of a link 1 pivotally mounted on the male clutch member M to allow the dog radial movement, like the link 1 in Fig. 4. The spring whereby the dog is held pressed against the cam surface may be applied to a rod extending radially from a ring 11 surrounding the bush 10, said rod passing through a hole in an annular flange of the member M, as in the arrangement shown in Fig. 4. Or the bush 10 may be carried by a spring controlled slide movable radially in a guide of the male member M. By means of the springs 12 the shaft 9 is permitted a limited spring controlled axial movement within the bush 10 in response to slight relative axial movements between the clutch members M and F. The said shaft is also allowed a very small rotative movement within the bush as by means of a loose key connection therewith indicated by 13. 6 indicates the recess in the cam C of the female member, the dog D and the recess being here shown as tapered to facilitate engagement and withdrawal.

By this construction, the shock of any contact that may occur between the dog and the side surface of C in initially connecting the clutch members, is lessened by the spring 12, which allows the dog to move back slightly when such contact takes place; also the slight rotation of the shaft 9 within the bush 10, permits the surfaces of the dog and the recess 6 to adjust themselves, so that pressure between them is more evenly distributed over their contacting surfaces, than if those surfaces were unable to adjust themselves except by the wear and tear of use.

Further axial friction between the dog and its recess is replaced by friction on the relatively large surface of the dog shaft 9, which should be kept well lubricated, while relative radial movement of the dog and recess is replaced by movement of the spring controlled link 1 and slight rotation of the shaft 9 within its bush 10.

Thus when in engagement, the surface of the dog and its recess 6 remain in practically fixed contact and may, in consequence, be made smaller than is usual.

It is obvious that my invention may be very considerably modified in constructional details without departing therefrom.

In my specification of earlier date, Serial No. 269,866, there is described and shown a clutch wherein a radially movable and laterally projecting dog carried by the male clutch member is caused by relative axial movement of the male and female clutch members to enter a spiral channel or groove, closed at its ends, formed in the inner face of the female member, and in traveling along this spiral groove, with which it makes a close sliding fit, to compress air between it and the end of the channel or groove and thus prevent jar or shock. On disengagement of the members, a spring returns the dog to its normal position, and this spring incidentally causes some pressure between the dog and one side of the spiral groove.

I wish it to be clearly understood that my present claims are not intended to cover any arrangement of clutch coupling in which the dog enters a spiral cam groove closed at its ends, and fits the same sufficiently closely to compress air within the groove in traveling along the latter. In the present invention reliance for bringing the angular speeds of the two clutch members closer together is placed solely on the effect of the sliding pressure contact between the dog and the cam surface, whereas in my said earlier specification reliance was placed solely on the effect of air compression by the dog.

What I claim and desire to secure by Letters Patent of the United States is:—

1. In a clutch coupling the combination with a female clutch member having a cam surface and a recess in the latter, of a male clutch member axially alined with said female clutch member, said clutch members being relatively movable to engage and disengage the same, a dog carried by said male clutch member, and spring means adapted to force said dog into gradually increasing frictional contact with said cam surface and ultimately into the recess in the latter.

2. In a clutch coupling the combination with a male clutch member and a radially movable dog carried thereby, of a female clutch member having a cam surface over which said dog is adapted to slide with gradually increasing friction, said clutch members being relatively movable to engage and disengage the same, and a recess in said cam surface which said dog is adapted to enter.

In testimony whereof I have hereunto set my hand in the presence of two witnesses.

FRANCIS HERBERT ALEXANDER.

Witnesses:
JOHN JOSEPH WELCH,
JOHN THOMAS HETHERINGTON DIXON.